United States Patent [19]
Uchiyama et al.

[11] Patent Number: 4,986,670
[45] Date of Patent: Jan. 22, 1991

[54] TEMPERATURE MEASUREMENT DEVICE

[75] Inventors: Futoshi Uchiyama; Ko Agatsuma; Takeshi Ohara; Koichi Tsukamoto, all of Tsukuba; Sumiyuki Ishigami, Tokyo; Mitsuru Sato, Tokyo; Hisashi Sugimoto, Tokyo, all of Japan

[73] Assignee: Agency of Industrial Science & Technology, Ministry of International Trade & Tokyo Denpa Co., Ltd., Tokyo, Japan

[21] Appl. No.: 437,666

[22] Filed: Nov. 17, 1989

[30] Foreign Application Priority Data

Nov. 19, 1988 [JP] Japan .................. 63-291092

[51] Int. Cl.$^5$ .................. G01K 11/26; G01K 7/32
[52] U.S. Cl. .................. 374/117; 310/361; 310/368; 340/870.17; 340/870.30
[58] Field of Search ............... 374/117, 118, 119, 142; 340/870.17, 870.30; 310/318, 361, 368; 331/66

[56] References Cited

U.S. PATENT DOCUMENTS

| | | | |
|---|---|---|---|
| 4,140,999 | 2/1979 | Conway | 340/870.17 |
| 4,233,843 | 11/1980 | Thompson et al. | 374/117 |
| 4,249,418 | 2/1981 | Ebata | 374/117 |
| 4,340,796 | 7/1982 | Yamaguchi et al. | 374/117 |
| 4,377,733 | 3/1983 | Yamaguchi et al. | 374/117 |
| 4,437,773 | 3/1984 | Dinger et al. | 374/117 |
| 4,475,024 | 10/1984 | Tateda | 374/117 |
| 4,592,663 | 6/1986 | EerNisse et al. | 374/117 |
| 4,772,130 | 9/1988 | Ueda et al. | 374/117 |

FOREIGN PATENT DOCUMENTS

| | | | |
|---|---|---|---|
| 0026723 | 1/1982 | Japan | 374/117 |
| 0052535 | 3/1983 | Japan | 374/117 |
| 0190736 | 11/1983 | Japan | 340/870.17 |
| 0206935 | 12/1983 | Japan | 374/117 |
| 0138131 | 6/1986 | Japan | 374/117 |
| 0881542 | 11/1981 | U.S.S.R. | 374/117 |

OTHER PUBLICATIONS

Arlett, P. L. et al., "Crystal-Oscillator-Based Device for Remote Power Line Temperature Sensing," James Cook University (Dec. 1978).

Primary Examiner—William A. Cuchlinski, Jr.
Assistant Examiner—Diego F. F. Gutierrez
Attorney, Agent, or Firm—Oblon, Spivak, McCelland, Maier & Neustadt

[57] ABSTRACT

A temperature measurement device is provided with a temperature sensing element which contains a quartz resonator having a quartz oscillating crystal whose ratio of width to thickness is in the range of 9.48 to 9.69, and an antenna which receives stimulus for the quartz oscillating crystal and transmits waves of reverberatory oscillation. The temperature measurement device is capable of measuring temperatures in the range of normal room temperature to extremely low temperatures (4° K.).

7 Claims, 8 Drawing Sheets

TEMPERATURE MEASUREMENT DEVICE

BACKGROUND OF THE INVENTION

1. Field of the Invention

This invention relates to a temperature measurement device which uses as its temperature sensing element a quartz resonator which can measure a wide range of temperatures from extremely low temperature to room temperature at high resolution.

2. Prior Art Statement

In equipment which uses or controls various physical phenomena which occur in the extremely low temperature region, temperature sensors which are able to measure temperatures in the range of, for example, from several degrees K. to 300 K. (−269° C. to 25° C.) with high resolution and high precision are vital.

Conventional temperature sensors include sensors which employ as their temperature sensing element platinum, the semiconductor material germanium, carbon or other materials whose resistance values change with temperature, along with thermocouples which employ thermoelectromotive force.

However, while the known temperature sensors described above are able to measure temperature changes at relatively high precision over certain specific temperature ranges, little variation is exhibited over other temperature ranges, making the measurement of temperature over the entire range from extremely low temperature to room temperature difficult. For example, as shown by the line "a" on FIG. 1, the change in resistance of a temperature sensor which uses platinum as its temperature sensing element is small in the extremely low temperature region, so it is difficult to measure temperature changes in that region with high resolution. On the other hand, as shown by the line "b" on FIG. 1, a temperature sensor which uses germanium, carbon or another semiconductor as its temperature sensing element demonstrates a large change in resistance due to temperature at extremely low temperature so it is able to measure temperatures in this region at high resolution, but in the region from 15 K. to 300 K., its change in resistance decreases rapidly so the resolution of temperature measurement drops in this region.

To remedy this situation, the conventional method of measuring temperatures at high resolution and good precision over a wide range from extremely low temperature to room temperature is to use a combination of several temperature sensors of different temperature measurement range characteristics, so depending on the temperature range to be measured, the device can be switched to the temperature sensor which is able to measure that temperature range at high precision, and then carry out the temperature measurement.

However, this method of carrying out temperature measurement by using several different types of temperature sensors in tandem causes problems in that the temperature sensor construction and measurement process become complex and the characteristics of the temperature sensing elements are different, increasing dispersion in measurement characteristics.

In the case of temperature sensors which employ variation in resistance, power supply circuits able to supply an accurate constant current are required, and temperature sensors which employ thermocouples must always have a set reference zero point (freezing point).

Furthermore, these temperature sensors normally comprise a temperature sensing element (measurement section) and a main measurement unit (computation and display section), and particularly in the measurement of temperatures in the extremely low temperature region, the temperature sensing element is placed in the region of extremely low temperature and electrically connected by wire to a main measurement unit placed outside of this region. However, this requires that a wire with one end at room temperature is inserted into a region of extremely low temperature, causing an inflow or outflow of heat to the region of extremely low temperature, and thus is not preferable.

In Japanese Patent Public Disclosure No. SHO 63(1988)-50646, a temperature measurement device which uses as its temperature sensing element a quartz resonator and can remotely measure the temperature of a room-temperature region to be measured was disclosed, but in that publication, measurement of extremely low temperatures was not touched upon at all.

The object of this invention is to provide a temperature measurement device which is able to accurately measure the temperature of a region to be measured without disturbing that region measured by outflow or inflow of heat.

SUMMARY OF THE INVENTION

In order to achieve the above objects, the temperature measurement device of the invention has a temperature sensing element which comprises a quartz resonator containing a quartz oscillating crystal whose ratio of width to thickness is 9.48 or greater, and an antenna which receives stimulus for the quartz oscillating crystal and transmits waves of reverberatory oscillation.

A quartz oscillating crystal cut with the above ratio of width to thickness has a crystal impedance which is virtually unchanged over a wide range of temperatures from extremely low temperature to room temperature. If electromagnetic waves of varying frequency are intermittently transmitted to the quartz resonator, when the frequency of the transmitted electromagnetic waves matches the resonant frequency of the quartz resonator, the quartz oscillating crystal will continue reverberatory oscillations even if the transmission of electromagnetic waves is suspended. These reverberatory oscillations will then be radiated as radio waves from an antenna connected to the quartz oscillating crystal. Therefore, by receiving these reverberatory radio waves when electromagnetic waves are not being transmitted, accurate measurement of a wide range of temperatures from extremely low temperature to room temperature becomes possible with a single quartz oscillating crystal. Since the quartz oscillating crystal (measurement section) is not connected to a transceiver (computation and display section) by wire, thermal disturbance of the region being measured by a connection wire is avoided.

The above and other features and objects of the invention will become apparent with the following detailed description made with reference to the attached drawings.

DETAILED DESCRIPTION OF THE PREFERRED EMBODIMENTS

Figure 2:
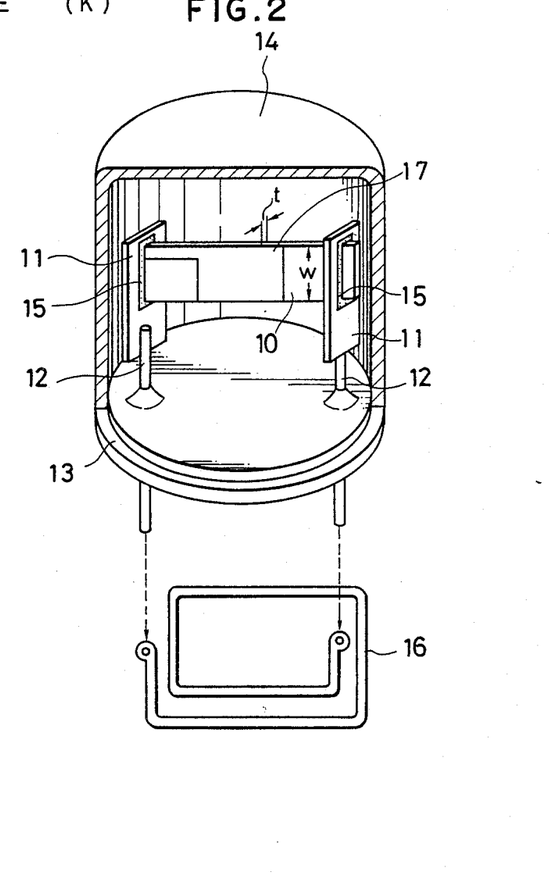
FIG. 2 is a partial cutaway perspective view of a first embodiment of the temperature sensing element of the temperature measurement device of this invention.

FIG. 2 is a perspective view of a first embodiment 1 of the temperature sensing element of the temperature measurement device of this invention. Numeral 10 is a quartz oscillating crystal cut to a specified ratio of width to thickness (w/t) as described later, whose two major oscillating surfaces are provided with driving electrodes 17. Each end of the quartz oscillating crystal 10 is supported and secured to one of a pair of support members 11 made of flat springs of 50μm-thick nickel silver with an adhesive 15 of epoxy resin of superior electrical and thermal conductivity which maintains its resiliency even at extremely low temperature. Each of these support members 11 is supported on the top end of a lead electrode 12 which passes through and is supported by an insulating base 13. The portions of these lead electrodes 12 which extend below the base 13 are connected to a loop antenna 16 which is able to effectively receive radio waves transmitted from the main measurement unit to be described later.

This loop antenna 16 employs as a support material a tube of a ceramic material which has an extremely low coefficient of thermal expansion even in extremely low temperature regions, for example.

In order to shield the quartz oscillating crystal 10 from contact with the outside air, it is covered with a cap-shaped cover 14. The open end of the cover 14 is hermetically mated to the base 13 and helium gas is encapsulated within the cover 14 to improve sensor response.

As is known, when an electric field is applied to a quartz oscillating crystal 10, the resonant frequency of the quartz crystal 10 varies with the temperature while the crystal impedance (which is the equivalent resistance of a quartz resonator and is hereinafter called the "CI value") does not substantially vary with temperature. Therefore, it is possible to find the temperature of the region at which the quartz resonator is positioned by measuring the resonant frequency of the quartz oscillating crystal 10.

Figure 3:
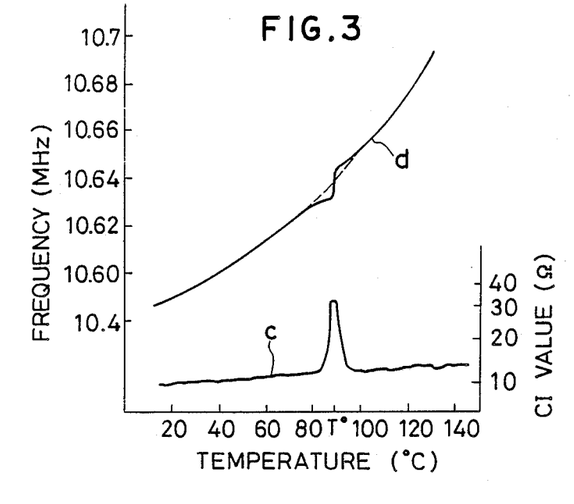
FIG. 3 is a graph of the CI value and resonant frequency as functions of temperature for a quartz crystal.

However, when a quartz crystal is used to measure a wide range of temperatures, the crystal impedance changes rapidly at a specific temperature of T° C. as shown by curve "c" on FIG. 3 to cause an abnormal frequency change as shown by curve "d" on the same figure. If for example, when a quartz resonator is applied to an oscillator circuit, oscillation would halt at a temperature of T° C. at the point, known as the CI dip point where the CI value changes rapidly, or when the quartz resonator is used for the measurement of temperature, a large error would be introduced in the measured values at temperatures about T° C.

This rapid change at the CI dip point is generally thought to be caused by coupling of the frequency-temperature coefficients of two different modes (e.g. thickness shear vibrations and higher flexural vibrations) at a certain temperature.

Figure 4:
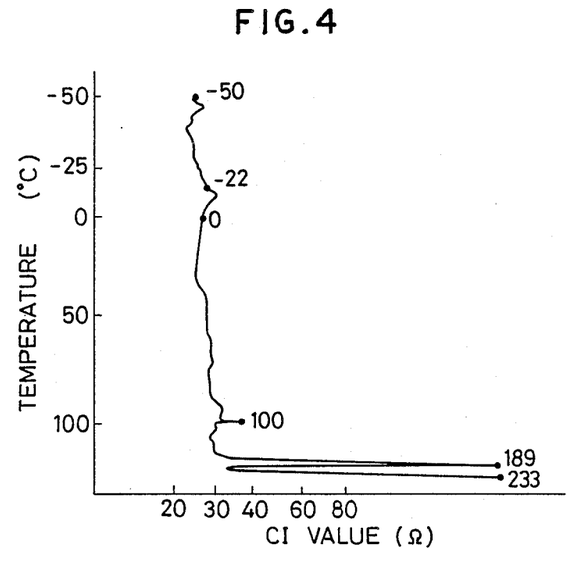
FIG. 4 is a graph of the CI value as a function of temperature for a quartz crystal having a width-to-thickness ratio of 9.69.
Figure 5:
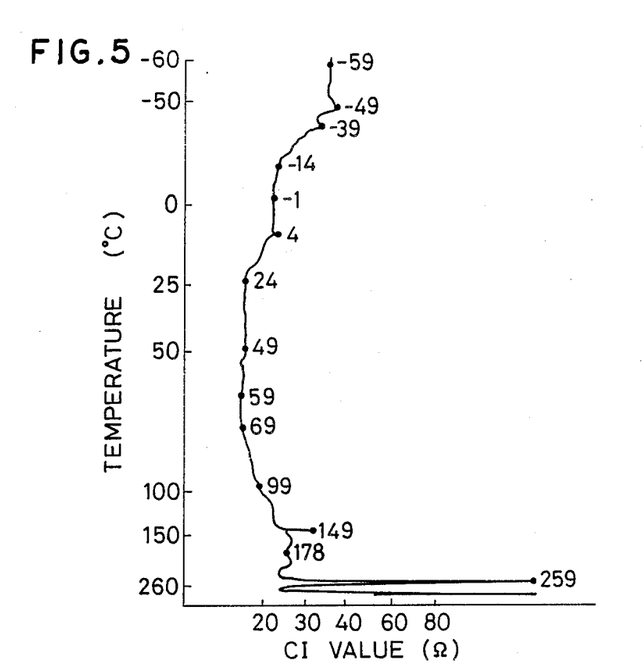
FIG. 5 is a graph of the CI value as a function of temperature for a quartz crystal having a width-to-thickness ratio of 9.58.
Figure 6:
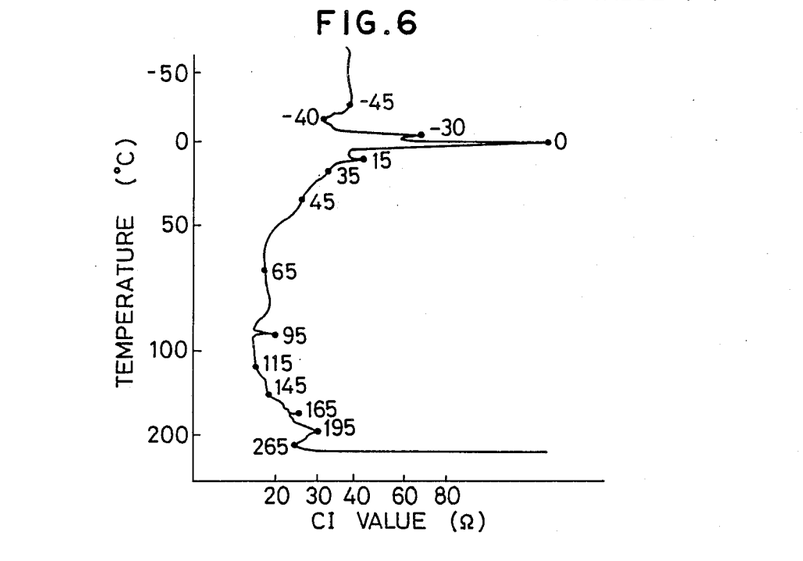
FIG. 6 is a graph of the CI value as a function of temperature for a quartz crystal having a width-to-thickness ratio of 9.48.

To remedy this situation, the inventors prepared several quartz blanks each with different w/t ratios, w being the width of the quartz oscillating crystal and t being its thickness. Upon measuring the CI values of each quartz blank, a quartz blank with a w/t ratio of 9.69 exhibited CI dips at 189° C. and 233° C. as shown in FIG. 4, but with a quartz blank with a w/t ratio of 9.58 the CI dip appeared to near 259° C. as shown in FIG. 5, while a quartz blank with a w/t ratio of 9.48 revealed that the CI dip appeared in the vicinity of 0° C. as shown in FIG. 6.

The strip-shaped quartz crystals using thickness shear vibrations to be employed in this invention were verified in each of the above cases (namely 9.48, 9.58 and 9.69) to experience no CI dips indicating major aberrations in resonant frequency below the temperatures at which the above CI dips occurred down to the extremely low temperature region of 4 K.

Therefore, by setting the w/t ratio of quartz blanks constituting the temperature sensing element of the temperature measurement device at least in the range $9.48 < w/t < 9.69$, no CI dips which would affect the frequency will occur and the resonant frequency will change smoothly in proportion to the temperatures in the range from the extremely low temperature to temperatures near 200° C. and, therefore, temperatures in this range may be measured with high accuracy by measuring the resonant frequency of the quartz blanks.

Figure 7:
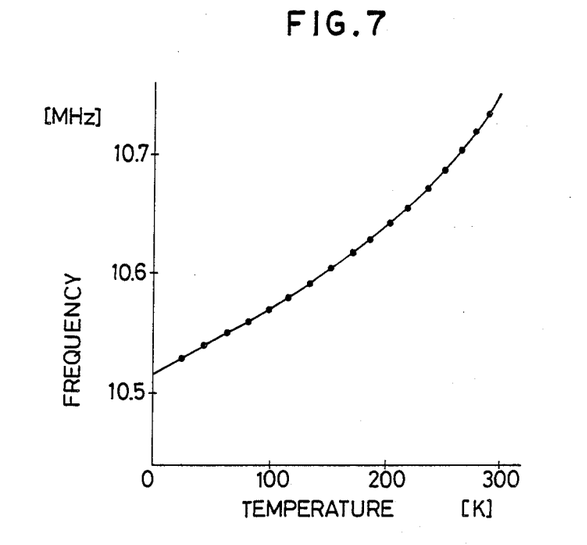
FIG. 7 is a graph of the resonant frequency of a temperature measurement device of this invention using the temperature sensing element shown in FIG. 2.

FIG. 7 is a graph of the resonant frequency as a function of temperature in a temperature sensing element of the structure shown in FIG. 2 when a quartz blank of dimensions 6 mm long, 1.695 mm wide and 0.1784 mm thick is used as the quartz resonator (w/t ratio=9.5). The horizontal axis is absolute temperature K. and the vertical axis is resonant frequency.

As is readily apparent from this graph, the rate of change of the resonant frequency of the quartz crystal gets slowly smaller as the extremely low temperatures are approached, but the rate of change is not greatly different from that at room temperature (300 K.). For example, the rate of change near 300K. is 1,000 Hz/K., yet the average rate of change from 4.2 K. to 57 K. is 120 Hz/K.

Therefore, particularly in the extremely low temperature region, if a frequency on the order of 1 Hz is measured, the average resolution of 0.01 K./H can be obtained from 4.2 K. to 57 K.

After subjecting a quartz oscillating crystal to repeated thermal shocks by rapidly changing the temperature, the change in resonant frequency was measured to be a temperature change of approximately 0.4 ppm, which upon temperature conversion becomes 0.03 K.

Thus the temperature measurement device of the invention is able to measure temperature with extremely high accuracy, and its reliability is improved while at the same time, by assuming the thickness shear vibration orientation, the quartz oscillating crystal can be made more compact and the resonant frequency can be increased, allowing a wireless temperature measurement device to be comprised as described later.

Figure 8:
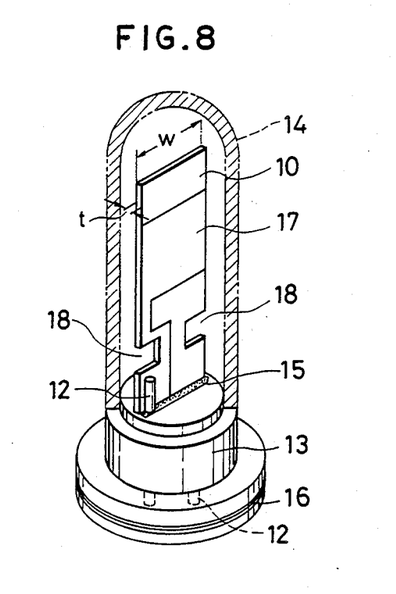
FIG. 8 is a perspective view of a second embodiment of the temperature sensing element of the temperature measurement device of this invention.

FIG. 8 shows a second embodiment of the temperature sensing element of the temperature measurement device of this invention. A quartz oscillating crystal 10 cut to the specified w/t ratio described above and provided with driving electrodes 17 on both sides is supported by bonding its bottom edge with electrically-conductive adhesive 15, as in the previous preferred embodiment, to a pair of lead electrodes 12 which pass through the base 13 and are hermetically secured. In order to shield the quartz oscillating crystal 10 from contact with the outside air, it is covered with a cap-shaped cover 14 within which helium gas is encapsulated. The portions of the lead electrodes 12 which extend below the base 13 are connected to an antenna 16.

In this the second embodiment, cutouts 18 are formed on part of the quartz oscillating crystal 10. By means of these cutouts 18, thermal stress is prevented from reaching the major oscillating surfaces of the oscillating crystal, particularly at low temperatures.

Figure 9:
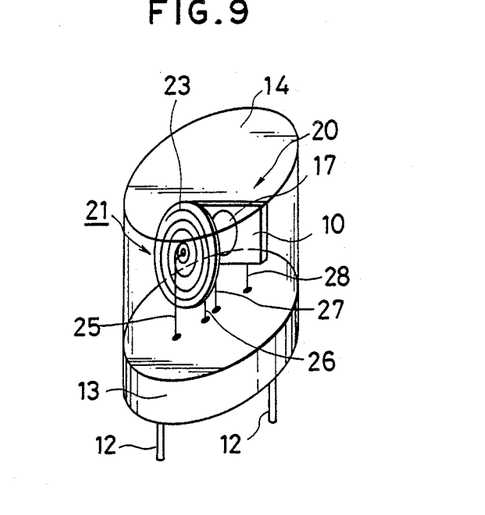
FIG. 9 is a perspective view of a third embodiment of the temperature sensing element of the temperature measurement device of this invention.
Figure 10A:
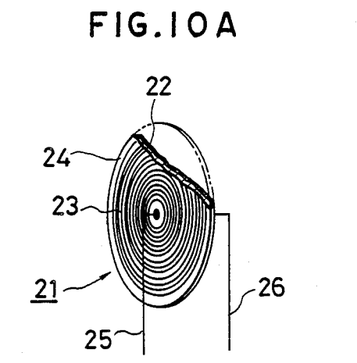
FIG. 10(a) is an explanatory diagram showing the concrete structure of the impedance element of the temperature sensing element of FIG. 9.
Figure 10B:
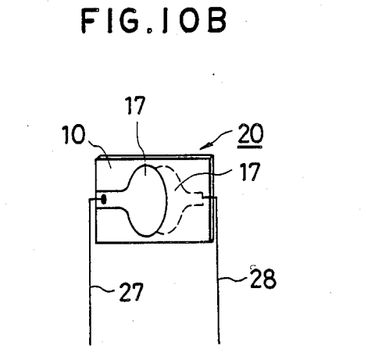
FIG. 10(b) is an explanatory diagram showing the concrete structure of the quartz resonator of the temperature sensing element of FIG. 9.

FIG. 9 shows a third embodiment of the temperature sensing element of the temperature measurement device of this invention, in which an impedance element 21 comprising resistors and coils is added to the quartz resonator of the first embodiment. An example of impedance element 21 is shown in FIG. 10(a). One side of a disk-shaped quartz substrate 24 is provided with a layer of carbon or other resistor 22, while the other side is provided with a coil 23 vapor-deposited or printed in the form of a spiral. This resistor 22 and coil 23 are connected in parallel or in series by lead electrodes 25 and 26.

The basic structure of the quartz resonator 20 is the same as that of the first embodiment of FIG. 2, in that a quartz oscillating crystal 10 is provided on both oscillating surfaces with driving electrodes 17 connected to lead electrodes 27 and 28.

The impedance element 21 and quartz resonator 20 are planted in the base 13 and secured with lead electrodes 25 and 26 or 27 and 28. The periphery is covered with a cover 14 within which He gas is encapsulated. Connected to lead electrodes 12 extending from the base 13 is an antenna which is omitted from the diagram.

Figure 11:
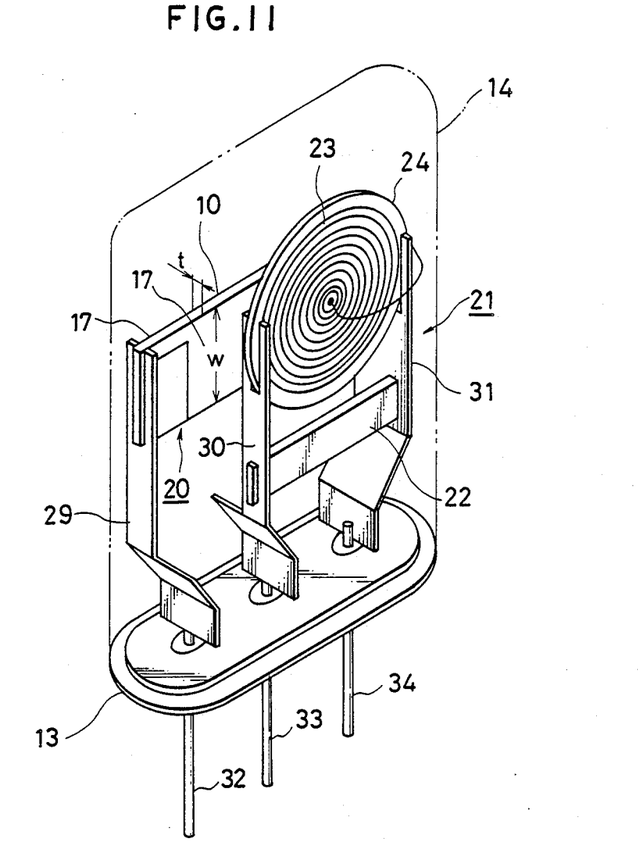
FIG. 11 is a perspective view of a fourth embodiment of the temperature sensing element of the temperature measurement device of this invention.

FIG. 11 shows, as a fourth embodiment, a modification of the temperature sensing element of the third embodiment. Here, the impedance element 21 comprises a coil 23 of a conductor vapor-deposited in the form of a spiral on one surface of a disk-shaped quartz substrate 24 or printed as a bulk element, and electrically connected to a bar-shaped back element as a resistor 22 arranged below the coil 23 with both supported between a pair of support members 30 and 31. The quartz resonator 20 has essentially the same configuration as the first embodiment of FIG. 2, in that driving electrodes 17 are provided on both oscillating surfaces of a quartz oscillating crystal 10 of a specified w/t ratio, and both ends of the quartz oscillating crystal 10 are supported by a pair of support members 29 and 31. The bottom ends of each of the support members 29, 30 and 31 are electrically connected to lead electrodes 32, 33 and 34, so lead electrodes 32 and 34 are for the quartz resonator 20 while lead electrodes 33 and 34 are for the impedance element 21 and an antenna is connected to lead electrodes 32 and 33.

Figure 12:
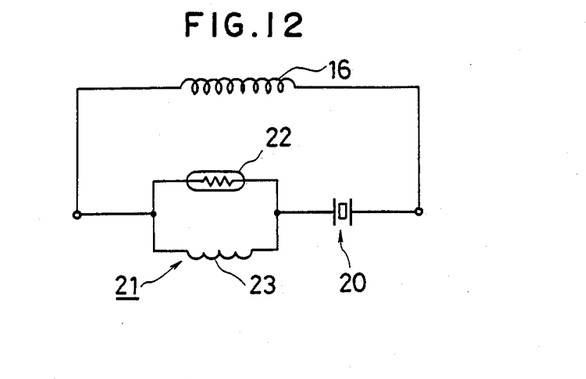
FIG. 12 illustrates the electronic circuitry of the third embodiment and the fourth embodiment of the temperature sensing element.

The electrical circuit for the temperature sensing elements of the third embodiment and the fourth embodiment is diagrammed in FIG. 12. A coil 23 of inductance L is connected in parallel to a resistor 22 of carbon, germanium or another element whose resistance increases at extremely low temperatures, forming an impedance element 21 which is connected in series to a quartz resonator 20. This results in the change in frequency of the quartz oscillating crystal 10 of the quartz resonator 20 becoming greater at extremely low temperatures, making the measurement of temperature just that much more accurate.

Figure 1:
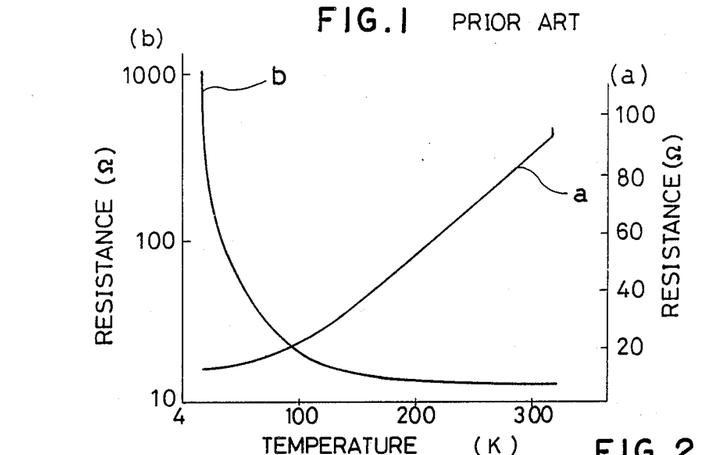
FIG. 1 is a graph of resistance as a function of temperature for platinum and semiconductor materials.
Figure 13:
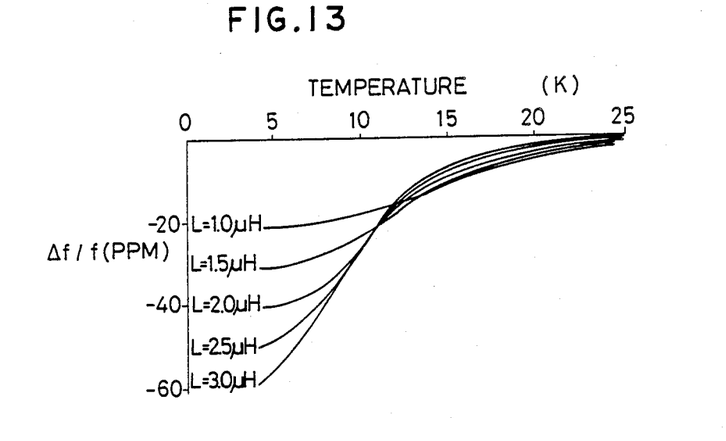
FIG. 13 is a graph of resistance as a function of temperature for a temperature measurement device to which the impedance element of this invention is added.

As an example, FIG. 13 illustrates the rate of change of the temperature sensing element frequency when the frequency of the temperature sensing element is held fixed while the resistance is varied using a carbon body as in line "b" of FIG. 1 with the coil (L) as a parameter. As described above, adding an impedance element 21 allows temperatures in the extremely low temperature region to be measured at high precision and high resolution.

Figure 14:
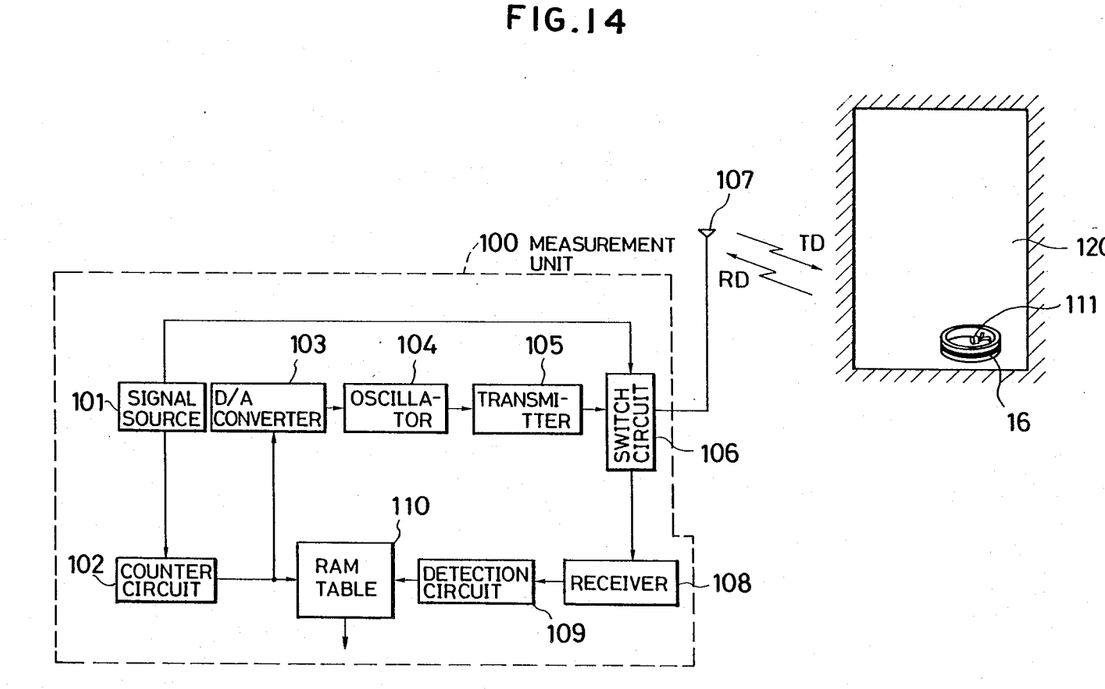
FIG. 14 is a block diagram showing a preferred embodiment of the main measurement unit of the temperature measurement device of the invention.

FIG. 14 is a block diagram showing a preferred embodiment of the main measurement unit 100 of the temperature measurement device of the invention, in which 101 is a standard signal source which provides a standard clock signal as output, 102 is a counter circuit which is reset at a certain count value, 103 is a D/A converter which converts the calculated value from the counter circuit into an output level, 104 is a voltage-controlled oscillator the oscillation frequency of which is controlled by the input signal level, 105 is a transmitter, 106 is a switch circuit, 107 is an external antenna, 108 is a receiver which effectively amplifies the radio waves received by the external antenna 107, 109 is a detection circuit for received radio waves, 110 is a RAM table which is addressable by the calculated output of the counter circuit 102, for example, so that the data at that address can be read by the output of the detection circuit 109.

The temperature sensing element 111 of the temperature measurement device of the invention is placed within an extremely low temperature tank 120 within which the superconducting state is formed by applying powerful magnetic fields and cooling with helium gas or the like.

Figure 15:
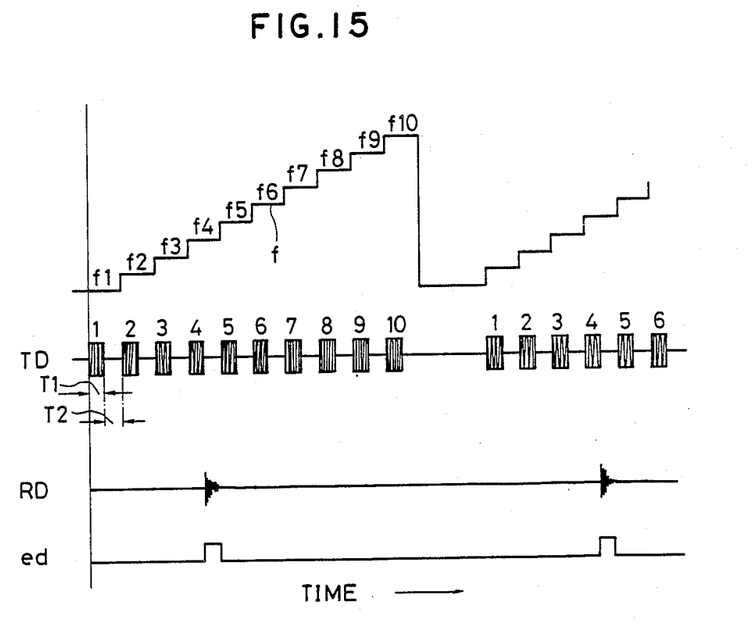
FIG. 15 is a waveform diagram of the transmitted electromagnetic wave and the received signal.

As shown in FIG. 15, intermittent transmission of radio waves TD from the external antenna 107 is controlled by the switch 106 so that transmission lasts for only a period of length $T_1$, followed by a period of length $T_2$ when transmission of radio waves is suspended and the receiver 108 switches over to the receiving state.

The frequency f of the transmitted radio waves TD sequentially increases stepwise ($f_1 \to f_2 \to f_3 \ldots$) at each clock period, in response to the staircase waveform input to the oscillator 104, and intermittently the antenna 107 will transmit the waves to the temperature sensing element 111.

Since the quartz oscillating crystal has an extremely high Q value, when the frequency f of the transmitted radio waves does not match the resonant frequency of the quartz oscillating crystal, the quartz crystal will not be excited.

However, as shown in FIG. 15, if for example the frequency $f_4$ of the transmitted radio waves TD matches the resonant frequency $f_0$ of the quartz oscillating crystal, the quartz oscillating crystal will continue to oscillate due to its high Q value even after the transmission of the radio waves TD is suspended.

When such reverberatory oscillations occur, the piezoelectric effect of the quartz oscillating crystal will cause radio waves RD based on the waves of reverberatory oscillation to be transmitted from the loop antenna 16 to the external antenna 107, and these waves will be received by the receiver 108.

The received waves are amplified and detected by detection circuit 109 and then sent to RAM table 110. The RAM table 110 is used to record frequencies of the transmitted radio waves according to the signals from the counter circuit 102. The table is also able to identify the resonant frequency of the quartz crystal by reading out the frequency which is addressed by the counter circuit 102 upon receipt of a detection signal from detection circuit 109. The resonant frequency which has been identified can then be converted to a temperature which is then displayed or outputted.

As described above, the temperature measurement device of the invention is effective in that it is configured such that a temperature measurement device using one quartz oscillating crystal can measure temperature changes over a wide range from extremely low temperature to room temperature, so temperature can be sensed at high resolution with high accuracy.

In addition, since the quartz resonator is not magnetically affected, it is particularly effective in the accurate measurement of temperatures within devices to which powerful magnetic fields are applied to achieve extremely low temperatures.

Furthermore, the temperature sensing element is not mechanically connected to the main measurement unit, so the temperature may be accurately measured without disturbing the temperature distribution in the region being measured.

What is claimed is:

1. A temperature measurement device for measuring temperatures in the range of normal room temperature to extremely low temperature comprising:
   a temperature sensing element located in a region, the temperature of which is to be measured; and
   a main measurement unit locate outside the region so as not to contact said temperature sensing element, in which
   said temperature sensing element includes
      a quartz resonator having a quartz oscillating crystal whose ratio of width to thickness is in the range of 9.48 to 9.69, and
      first antenna means which is connected to said quartz oscillator for receiving radio wave signals for stimulating said quartz oscillator and for transmitting radio wave signals of reverberatory oscillation waves from said quartz oscillator, and
   said main measurement unit includes
      second antenna means for transmitting radio wave signals for stimulating said quartz oscillator and for receiving said radio wave signals of the reverberatory oscillation waves from said first antenna means,
      means for identifying the resonant frequency of the quartz oscillating crystal based on the radio wave signals received by said second antenna means and
      conversion means for converting the resonant frequency identified into a temperature in the region wherein the temperature in the region is in the range of normal room temperature to the extremely low temperature of 4° K.

2. The temperature measurement device of claim 1 in which the first antenna is a loop antenna.

3. The temperature measurement device of claim 1 in which said temperature sensing element also contains an impedance element connected to said quartz resonator.

4. The temperature measurement device of claim 3 in which the impedance element comprises a resistor and coil.

5. The temperature measurement device of claim 4 in which the resistance value of the resistor increases at extremely low temperatures.

6. The temperature measurement device of claim 4 in which the resistor is made of germanium or carbon.

7. The temperature measurement device of claim 1 in which said second antenna means includes means for intermittently transmitting radio waves having different frequencies to said first antenna means.

* * * * *

UNITED STATES PATENT AND TRADEMARK OFFICE
CERTIFICATE OF CORRECTION

PATENT NO. : 4,986,670

DATED : January 22, 1991

INVENTOR(S) : Futoshi Uchiyama et al.

It is certified that error appears in the above-identified patent and that said Letters Patent is hereby corrected as shown below:

ON TITLE PAGE:

The Assignees are incorrect, should be, --Agency of Industrial Science & Technology, Ministry of International Trade & Industry and Tokyo Denpa Co., Ltd., both of Tokyo, Japan--.

Signed and Sealed this

Fifteenth Day of September, 1992

Attest:

DOUGLAS B. COMER

Attesting Officer

Acting Commissioner of Patents and Trademarks